Figure 1:
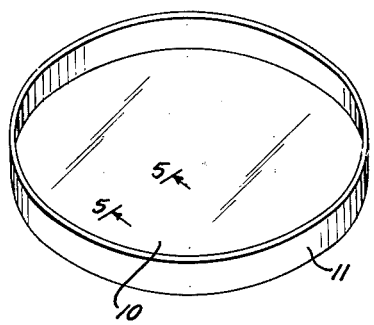

July 9, 1963

A. ALDRICH ETAL 3,097,070

PLASTIC WARE FOR SCIENTIFIC USE

Filed Nov. 6, 1958

INVENTORS.
ADELBERT ALDRICH
ROBERT SCHWARZ, JR.
BY WILLIAM H. GOTTSCHALK

Dean Fairbank & Hirsch

ATTORNEYS

United States Patent Office 3,097,070
Patented July 9, 1963

3,097,070
PLASTIC WARE FOR SCIENTIFIC USE
Adelbert Aldrich, La Crescenta, Robert Schwarz, Jr., Beverly Hills, and William H. Gottschalk, Encino, Calif., assignors to Falcon Plastic Products, Culver City, Calif., a copartnership
Filed Nov. 6, 1958, Ser. No. 772,224
4 Claims. (Cl. 23—253)

Our present invention is more especially concerned with ware of plastic for scientific laboratory use, which has particular utility for manipulation of chemical and biological substances.

As conducive to a clear understanding of the invention, it is noted that ware employed for chemical and biological manipulations, such as Petri dishes, serological spot plates, tissue culture dishes, culture tubes, syringes, microdiffusion dishes and the like have heretofore commonly been made of glass.

The high first cost of glass ware leads to the need for successive re-use as an economic necessity. However, preparing glass equipment for re-use involves such tedious and time-consuming operations as scraping, scrubbing, exhaustive rinsing or sterilization in an autoclave, each of which entails attendant expense and risk of breakage or other impairment of the utility of the item by abrasion or chipping. For many chemical and biological applications, contamination of the surfaces of the ware with even minute traces of residuum from the previous use or of detergents employed in the cleaning process, or failure to re-sterilize the ware properly may render it completely useless. Hence, even if considerable care and expense is devoted to preparation for reuse, the possibility exists that a certain proportion of such vessels or utensils will not perform as desired. In addition, breakage of glass utensils used in biological research may cause injury to the operator, such as cuts and infection with possibly serious consequences, especially where a glass utensil is employed in studies of pathogenic organisms.

Such glass units though relatively high in cost, moreover have poor optical properties due to waviness of the surfaces of the unit, which renders many of them substanially useless for delicate analytic work, unless blown or molded, in which case their cost would be prohibitive.

Were it possible to overcome the serious disadvantages of such glass utensils by resort to plastic ware, particularly for operations which are repetitive and often conducted with large numbers of units, a radical improvement would be attained.

Among the advantages of plastic, were it otherwise rendered suitable for the purpose, the following may be listed as the most significant:

(a) The articles may be fabricated at much lower cost.
(b) The articles are substantially non-breakable.
(c) The articles may be fabricated in more intricate shapes, with thinner sections and more precise dimensions than is commercially possible with glass.
(d) Where appropriate types of transparent plastic are employed, optical flatness superior to that of glass may be obtained at much lower cost than with glass, thus rendering possible direct microscopic examination through the plastic wall.
(e) With appropriate types of transparent plastic there may be attained not only the optical flatness referred to as item d, but the animal or vegetable tissue or the like may be irradiated by ultra-violet rays or the like.
(f) The articles are substantially lighter than corresponding glass articles, thus providing greater ease in handling.
(g) The articles lend themselves readily to economical pre-sterilization.

In spite of all of the foregoing advantages, the use of plastic such as polystyrene, polyethylene, methacrylates or other plastic material, instead of glass for analytic laboratory ware and for utensils in which living cells or tissue is manipulated, has not heretofore been commercially feasible, among other reasons, because plastic ware is characterised by:

(a) Surface properties which interfere with adequate wettability by liquids with high surface tension, particularly aqueous solutions and water,
(b) Properties which tend to inhibit growth on and adhesion to the surface by living cells and tissue, thus preventing desired propagation and spreading of such cells or tissue,
(c) Susceptibility to attack by certain of the chemical reagents used therein, and
(d) Low resistance to abrasion.

The culturing of living plant or animal cells or tissue in vitro has become an important development in biological sciences, the technique being especially significant in the study of virus action on cells, genetics, the processes of cell division and various problems of cell growth and nutrition. Animal cells or tissues require a non-toxic, wettable surface in order to grow and spread efficiently.

The objectionable properties of plastic enumerated above render it unsatisfactory as such a growing surface and hence unusable for ware intended for such purposes.

It is among the objects of this invention to render plastic useful for manipulation of chemical and biologic substances, more especially for analytic laboratory ware and for apparatus in which living cells or tissue is manipulated, by overcoming all the foregoing inherent objections, thus providing plastic ware in which:

(a) The surface properties of the dish or other utensil are modified so that the surface is adequately wettable by aqueous solutions and water.
(b) The surface properties are so modified as to provide a suitable environment for spreading and propagation of cells in tissue culture.
(c) The surface resistance to various chemicals to which it may be subjected in use is greatly enhanced, and
(d) The surface is adequately resistant against abrasion.

Among other objects is to provide plastic ware of the above type which is superior to similar ware fabricated of glass and may be fabricated in any of a wide variety of shapes and of thin cross section, not possible with pressed or molded glass and is of initial cost so low that it is economically advantageous to discard it after a single use; indeed the laboratory ware of the present invention is of cost less than the cost of preparing for reuse conventional glassware designed for the purpose.

The invention is based upon the surprising discovery that an inorganic coating deposited by vaporization at temperature so low as not to cause distortion of the plastic dish or other utensil, overcomes all of the objections to plastic for use in chemical or biological manipulations and, more particularly, imparts to the plastic dishes or utensils the desired properties for the purposes which are more especially:

(a) Adequate wettability by aqueous solutions and water,
(b) Compatibility to living cells,
(c) Adequate resistance to attack by various reagents to which it may be subjected in use, and
(d) Adequate resistance to abrasion.

In carrying out the invention, plastic ware of polyethylene, methacrylate or the like may be used, although polystyrene is in general preferred because of its low cost and ease of molding.

The coating applied to the plastic is preferably an oxide of silicon, but may, if desired, be of some chemically inert metal such as tantalum or aluminum or a chemically inert crystalline compound such as magnesium fluoride, aluminum oxide or the like, which coating in each case would be applied by vaporization under high vacuum.

Procedures for applying vaporized films to various materials have been described in the technical literature, but that literature gives no suggestion that such films would have any utility to render scientific ware of plastic outstandingly useful and greatly superior to the costly, and in many respects objectionable, glassware that had heretofore alone been generally used for the purpose. The literature affords no suggestion that the serious shortcomings of plastic ware, that had heretofore rendered impossible its use for scientific purposes (such as analytic purposes), could be overcome by any means whatsoever, much less by the means of the present invention.

The susceptibility of plastic ware to distortion by heat moreover requires use of coating materials which vaporize in vacuum at relatively low temperatures of less than 3000° C., preferably less than 2000° C., yet provide on condensation upon the plastic surface, a continuous chemically inert film which is non-toxic to and otherwise compatible with living cells and tissue.

The limits of the thickness of the coating are related to the elasticity of the particular plastic used in the ware to be coated, the shape and size of the ware and the physical properties of the coating material. The essential requirement is provision of a continuous and unbroken film which will respond homogeneously to such flexure of the plastic base material as may be incurred in use. Coatings which are too thin do not dependably provide the desirable properties enumerated above, whereas coatings which are too thick tend to separate from the plastic base. Generally these coatings are of thickness between 0.1 and 1.5 microns.

In one preferred embodiment of this invention the base plastic of which is polystyrene and the vacuum vaporized coating material of which is silicon monoxide, the film thickness should be between 0.2 and 0.8 micron and preferably between 0.3 and 0.5 micron.

The coating is applied by vacuum evaporation of the coating substance. The vaporization of the coating material is effected by heat in a highly evacuated chamber, as by radiation, or by one or more heated filaments or by electron bombardment, the particular method, time of exposure and arrangement of the parts within the chamber being selected to avoid distortion of the plastic ware by heat, and assure uniform deposition of the coating on all of those surfaces of the ware which will come in contact with the substances to be introduced therein during use.

One embodiment that has been found to lend itself particularly to commercial utilization, involves the use of silicon monoxide (SiO) as the coating material applied by vaporization to the plastic ware. This monoxide, despite its relatively high cost, has been found especially useful because of its low vaporization temperature (1900° C. at atmosphere pressure) compared to that of silica ($SiO_2$) (2900° C. at atmospheric pressure).

By reason of the yellowish hue of the film of SiO, said film of SiO may be subjected to a final treatment with nascent oxygen which assures rapid oxidation of the SiO to $SiO_2$ throughout the thickness of the film, which film thus oxidized is substantially colorless and transparent.

A further advantage of such $SiO_2$ films is their capacity to transmit ultra-violet light. Thus, when used in conjunction with a plastic which also has satisfactory transmission characteristics in the ultra-violet region, such ware is useful for exposing tissue and cell cultures to such radiations, radiations which are not readily transmitted through the glass of which such equipment has been made.

Although the foregoing is believed to describe adequately the nature of the invention, various applications, uses and advantages will be set forth hereinafter.

Figure 2:
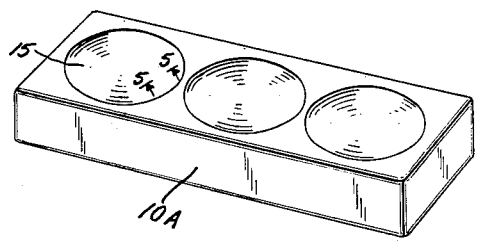
Figure 3:
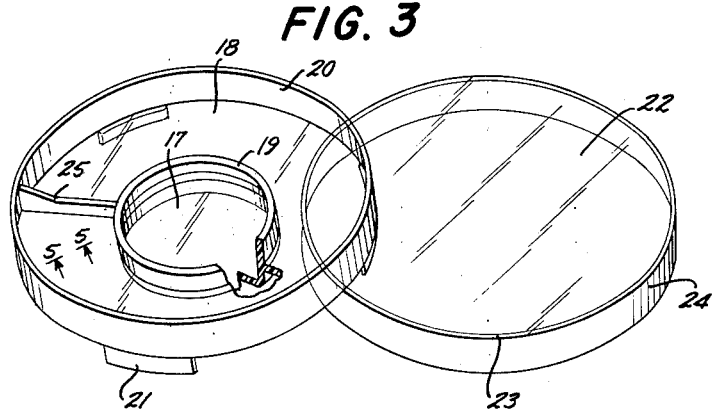
Figure 4:
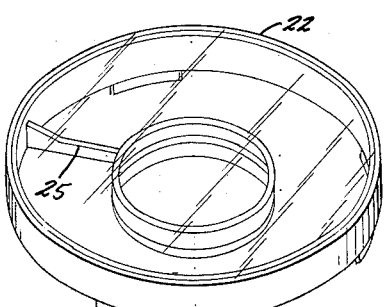
Figure 5:

In the accompanying drawings in which are shown a number of possible items of film coated plastic ware in which the invention may be embodied:

FIG. 1 is a perspective view of a Petri dish according to the invention,

FIG. 2 is a view similar to FIG. 1 showing a spot plate according to the invention, FIG. 3 is a perspective view showing a micro-diffusion dish in position for applying the sample and gas releasing reagent, FIG. 4 is a perspective view showing the micro-diffusion dish in operative position with the cover in place, and FIG. 5 is an enlarged cross-sectional detail view taken on line 5—5 of FIGS. 1, 2 and 3 showing the coating thickness on a greatly enlarged scale.

Referring now to the drawings, FIG. 1 shows a Petri dish of suitable plastic, which is entirely transparent and the bottom surface of which is substantially optically flat. The dish may comprise a circular or, if desired, a rounded-corner rectangular base 10 with an upstanding peripheral wall 11 over which may be telescopically mounted a cover (not shown), also desirably of plastic. The bottom of the Petri dish upon which the substance to be processed is lodged and the inner face of the upstanding peripheral wall 11 are coated, as best shown in FIG. 5, with a coating C of thickness preferably from 0.1 to 1.5 microns, though some departure from the preferred range of thickness may still be within the ambit of the invention. That coating is thin, adherent, water wetting, resistant to the chemicals to which it may be subjected in use, resistant to abrasion and compatible with human and animal cells in tissue culture. For many applications the coating should be transparent. Where, as is usually preferred, the plastic is polystyrene, the coating is desirably 0.2 to 0.8 micron and preferably 0.3 to 0.5 micron in thickness.

The coating may be and preferably is of a silicon oxide, but if desired, might be of inert metal such as tantalum or aluminum or of chemically inert crystalline compound such as magnesium fluoride, aluminum oxide or the like.

The coating is preferably applied by vacuum evaporation of the coating substance. Desirably, the vaporization of the coating material is effected by heat in a highly evacuated chamber, as by radiation, or by one or more heated filaments, or by ion bombardment.

One embodiment that has been found to lend itself particularly to commercial utilization, involves the use of silicon monoxide (SiO), as the coating material applied by vaporization to the dish or other utensil. This monoxide, despite its relatively high cost, has been found advantageous because of its low vaporization temperature compared to that of silicon dioxide ($SiO_2$). By reason of the yellowish hue of the film of SiO, a final treatment of the cooled film of SiO with nascent oxygen is especially desirable, since it serves readily to oxidize the SiO to $SiO_2$ which latter affords a colorless, transparent film among other advantages previously pointed out.

In use, all operations are conducted in a sterile transfer room. The cover (not shown) is lifted just sufficiently to permit insertion of a pipette containing suitable sterile medium and a culture of living cells or tissue. The cover is then replaced and the dish allowed to incubate at suitable temperature. Clones or plaques of proliferating cells or tissue adhering to the inside bottom surface of the dish appear after a few days.

The application of the invention to spot plates, as shown in FIG. 2, involves the use of a plastic block 10A which has a series of hemispherical depressions 15. The face of the plate, including the depressions, has the same coating C as described above in connection with the embodiment of FIG. 1, applied by the same procedure and with the advantages above set forth.

The invention is also applicable in the same manner to the treatment of spot slides, plastic culture tubes, culture bottles, syringes and the like.

One especially important application of the invention is to units for micro-diffusion analysis. The dish for such purpose is desirably of the same material, polystyrene, processed in the same manner as the Petri dish, spot plate and the like, above described.

In the micro-diffusion dish, there is a center well 17, which is recessed below the floor of the dish for maximum depth and ease of titration, at the same time resulting in a shallower annular chamber 18. The inner low rising wall or barrier 19, separates the center well from the annular chamber, which is encompassed by the peripheral wall 20 of the dish. Molded as a unitary part of the dish are three arcuate leg fins 21, desirably equally spaced, and extending downward from slightly within the periphery of the floor of the dish. The annular chamber 18 has a dam 25 integral therewith, rising from the floor of said chamber and extending radially across its entire width, desirably midway between two of the leg fins 21, more particularly from the outer wall 20 to the rim 19 of the center cell. That dam is desirably highest at the outer wall 20, from which it tapers to a height at its inner end substantially equal to that of the rising wall or barrier 19.

The dish in this instance, as the Petri dish, of the embodiment of FIG. 1, is molded from transparent plastic, preferably polystyrene. When the dish is of polystyrene, it is treated exactly as that of FIG. 1 for a coating, desirably 0.2 to 0.8 micron and preferably 0.3 to 0.5 micron in thickness, covering the inner face of the center well, the outer wall 20 of the dish, the wall 19 of the center well as well as the dam 25.

In use, an absorptive solution is placed in the center well 17. Into the outer ring or annular chamber 18 is placed, separately at opposite sides of dam 25 and therefore without mixing, the solution to be analyzed and a reagent in solution which will release the material to be analyzed in gaseous form when these two solutions are intimately mixed. The cover 22 is then rapidly put in place and the two solutions are mixed by swirling. In principle, the gas generated by this admixture diffuses over the surface of the center well where it is absorbed and trapped in the appropriate solution as described above. When the reaction is complete the cover of the dish is removed and the solution in the center well is back-titrated with a standard reagent.

As shown in FIG. 3, the cover 22, desirably also of plastic which has a top wall 23 and a peripheral rim 24 may be used, initially to support the fin 21 diametrically opposed to the dam 25 against the inner face of the rim of the inverted cover so that the dish becomes tilted at a suitable angle with the dam 25 at the lowest portion.

The depth of the annular chamber 18 and thus the height of the barrier 19 between it and the inner well 17 may be much reduced in the plastic dish as compared with the glass dish, while stability of the dish is maintained by the leg fins 19, thus speeding the rate of diffusion of gas into the well. Finally, the plastic dish is readily fabricated to provide an airtight fit between the base and the cover, whereas ground surfaces and some form of sealing grease are generally required in the glass dish. As a result of these improvements made possible by the present invention, the unit of FIGS. 3 and 4 provides faster (at least twice the rate is achieved in practice) and more positive micro-diffusion analysis.

Without the coating on the plastic dish, solution placed in either the well 17 or the annular chamber 18 would tend to form discrete droplets making uniform mixing difficult and some of the reagents used might react with the plastic, causing errors in the analysis. The coating results in a perfect wetting of the surfaces and free flow and mixing of the solutions equivalent to their behavior on chemically clean glass ware. The plastic dish is discarded after completion of the titration.

As contrasted with glass dishes for micro-diffusion analysis, the vapor diffusion rate according to the present invention is much greater, in the order of twice that of a glass dish, with correspondingly increased efficiency.

By the present invention:

(a) The floor of the dish may be readily made substantially flat with a variation over the entire surface not exceeding a few microns for uniform spread of the solution upon the floor of the dish and correspondingly speedy release and absorption of the released vapors;

(b) Mixing of the reacting materials of the outer ring before sealing the dish is minimized and no premature escape of vapor can occur;

(c) The dish is efficient in use due to the reduced volume of air space to be traversed by the released vapor in its travel to the gas-absorbing reagent in the center cell, as compared to glass dishes, and (d) There is no difficulty of handling or spillage of reagents.

The plastic dish of the present invention being much more easy to fabricate than one of glass, even though more intricate in design, costs approximately one-tenth that of a glass unit. Since the glass dish cannot be employed economically for a single use only, elaborate and costly cleaning procedures are absolutely essential for its effective reuse. These include thorough washing with water, degreasing of the ground glass seal with a test-tube brush or pledget, followed by subjecting the dish to dilute sulfuric acid and then rinsing with cold water and finally with distilled water. The initial cost of the plastic micro-diffusion dish is less than the cost of properly cleaning the glass dish, thus making it economical to discard the dish after a single use and obviating all of the labor, space and equipment which would otherwise be required for the cleaning operation.

The present invention effects a considerable economy in the analytic laboratory for chemical and bacteriological analysis, and indeed as we have seen, the disposable dish of the present invention is assured of sterility where residues of detergent, almost inevitable with washed glass dishes of this type, are likely to render such glass dishes unsuitable for the delicate purposes for which they are intended. Yet, the disposable plastic dish of the present invention is of lower cost than the cost of cleaning, after use, a glass dish for the same purpose.

It will be understood that many ancillary advantages, which may enhance the utility of plastic were designed for chemical or biological manipulation, may accrue by virtue of the inherent great flexibility of plastic as a material of construction and the wide range of plastics which may be employed. These plastics, by virtue of the invention, may for the first time be freed of the objectionable properties enumerated in the foregoing which had heretofore rendered them, for all practical purposes, useless in the applications described. Among these advantages are the wide choice of color or degree of opacity to visible or ultra-violet light, variability in the flexibility of the walls of the utensil, wide variability in electrostatic properties which may be further modified by the nature of the coating surface applied to the ware.

As an example of this latter property, the application of tantalum or platinum to plastic dishes might be of special value in the study of the effect of electrostatic potentials on the growth of cells or tissue.

It will be further understood that the disposable Petri dish, spot plate, culture tube, culture bottle, syringe, micro-diffusion dish or the like made according to the teachings of the present invention, when pre-sterilized as part of the manufacturing operation, is packaged in a sealed wrapper of cellophane, Pliofilm or the like to preserve its sterility prior to use.

As many changes could be made in the above article and process, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Disposable laboratory ware for use in holding materials for chemical, biological and physical manipulation comprising an article made from plastic material selected from the group consisting of polystyrene, polyethylene and methacrylate and having a container portion in the form of a cavity for holding the materials to be manipulated with the entire inner surface of the container portion including the portions which contact said materials having a continuous, unbroken, adherent coating of between approximately 0.1 and 1.5 microns in thickness of material selected from the group consisting of silicon oxide, tantalum, aluminum, magnesium fluoride and aluminum oxide whereby said surface is water wettable, compatible with living cells and tissue and adequately resistant to abrasion and chemical attack by the said materials.

2. Disposable laboratory ware for use in holding materials for chemical, biological and physical manipulation comprising an article made from polystyrene plastic material and having a container portion in the form of a cavity for holding the materials to be manipulated with the entire inner surface of the container portion including the portions which contact said materials having a continuous, unbroken, adherent coating of silicon oxide between approximately 0.1 and 1.5 microns in thickness whereby said surface is water wettable, compatible with living cells and tissue and adequately resistant to abrasion and chemical attack by the said materials.

3. A disposable micro-diffusion device comprising a dish portion and a complementary cover portion arranged to have sealing engagement therewith, said dish portion including a base having a peripheral flange extending completely around the outer edge thereof, a center well with an annular flange concentric with the peripheral flange and of lesser height than the peripheral flange, said annular flange enclosing a well for receiving an absorption agent and arranged so that an annular chamber is formed between the peripheral flange and the annular flange and a radially disposed dam extending across the annular chamber between the peripheral flange and the annular flange so that the material to be tested may be initially placed on one side of the dam and the reagent may be initially placed on the opposite side of the dam, said dish portion being made from polystyrene plastic material with the surfaces of the dish portion which contact the absorption agent, material to be tested and reagent having a continuous, unbroken, adherent coating of silicon oxide between approximately 0.1 and 1.5 microns in thickness whereby said surface is water wettable and adequately resistant to abrasion and chemical attack.

4. A disposable micro-diffusion unit as set forth in claim 3 in which the dish portion is provided with three dependent legs with one leg being disposed diametrically opposite to the dam and the other two legs being equally spaced circumferentially on opposite sides of the dam whereby the dish may be tilted downwardly towards the dam by resting the first mentioned leg on an elevated surface.

References Cited in the file of this patent

UNITED STATES PATENTS

| | | |
|---|---|---|
| 2,456,899 | Strong | Dec. 21, 1948 |
| 2,677,646 | Lovell et al. | May 4, 1954 |
| 2,677,647 | Lovell et al. | May 4, 1954 |
| 2,874,091 | Fisk | Feb. 17, 1959 |

OTHER REFERENCES

McIlvanie: Bibliotheca haematogiia (Basel), vol. 7, Jan. 20, 1958, pages 481–490.

Hawk: Pract. Phys. Chem., page 688, 13th edition, April 1954.